United States Patent
Maji et al.

(10) Patent No.: US 12,155,254 B2
(45) Date of Patent: Nov. 26, 2024

(54) SYSTEM AND METHOD FOR CONTROLLING DISCHARGE OF A BATTERY

(71) Applicant: SIGNIFY HOLDING B.V., Eindhoven (NL)

(72) Inventors: Goutam Maji, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1022 days.

(21) Appl. No.: 17/043,418

(22) PCT Filed: Apr. 4, 2019

(86) PCT No.: PCT/EP2019/058503
§ 371 (c)(1),
(2) Date: Sep. 29, 2020

(87) PCT Pub. No.: WO2019/193096
PCT Pub. Date: Oct. 10, 2019

(65) Prior Publication Data
US 2021/0021143 A1    Jan. 21, 2021

(30) Foreign Application Priority Data

Apr. 6, 2018   (IN) .............................. 201841013149
May 24, 2018   (EP) .................................... 18174070

(51) Int. Cl.
*H02J 7/00* (2006.01)
*H05B 45/10* (2020.01)
*H05B 45/3725* (2020.01)
*F21V 23/00* (2015.01)
*F21Y 115/10* (2016.01)
*H05B 45/335* (2020.01)
*H05B 45/375* (2020.01)
(Continued)

(52) U.S. Cl.
CPC .......... *H02J 7/00712* (2020.01); *H05B 45/10* (2020.01); *H05B 45/3725* (2020.01); *F21V 23/003* (2013.01); *F21Y 2115/10* (2016.08); *H02J 2207/20* (2020.01); *H05B 45/335* (2020.01); *H05B 45/375* (2020.01); *H05B 45/38* (2020.01); *H05B 45/39* (2020.01)

(58) Field of Classification Search
CPC ................................................. H02J 7/00712
USPC ......................................................... 320/107
See application file for complete search history.

(56) References Cited

U.S. PATENT DOCUMENTS 4,536,696 A   8/1985  Ray
7,023,185 B2  4/2006  Olson
(Continued)

FOREIGN PATENT DOCUMENTS

CN   101505101 A    8/2009
CN   101510730 B   12/2011
(Continued)

*Primary Examiner* — Yalkew Fantu

(57) ABSTRACT

A system comprises a battery, a load and a power converter for converting battery power from the battery into load power for application to the load. A system controller enables selection between a continuous discharge mode and a discontinuous discharge mode of the battery. In this way, the battery can be operated in different ways according to the most appropriate battery discharge characteristics.

12 Claims, 5 Drawing Sheets

(51) Int. Cl.
    *H05B 45/38*    (2020.01)
    *H05B 45/39*    (2020.01)

(56) References Cited

U.S. PATENT DOCUMENTS

| | | | |
|---|---|---|---|
| 9,729,059 | B1 | 8/2017 | Parto |
| 2003/0230334 | A1* | 12/2003 | Chang .................. H02J 7/35 |
| | | | 136/244 |
| 2008/0001547 | A1 | 1/2008 | Negru |
| 2009/0184665 | A1 | 7/2009 | Ferro |
| 2012/0133205 | A1 | 5/2012 | Adams et al. |
| 2012/0299553 | A1 | 11/2012 | Menegoli et al. |
| 2013/0249421 | A1 | 9/2013 | Cavallini et al. |
| 2017/0117730 | A1* | 4/2017 | Kim .................... H02J 7/00712 |
| 2019/0172683 | A1* | 6/2019 | Mavretic ................ H01L 28/40 |

FOREIGN PATENT DOCUMENTS

| | | | |
|---|---|---|---|
| EP | 2443723 | A2 | 4/2012 |
| JP | H11150875 | A | 6/1999 |
| JP | 2009541980 | A | 11/2009 |
| JP | 2013093969 | A | 5/2013 |
| JP | 2014030340 | A | 2/2014 |
| JP | 2014036389 | A | 2/2014 |
| JP | 2014079154 | A | 5/2014 |
| JP | 2015035921 | A | 2/2015 |
| KR | 20090107519 | A | 10/2009 |
| KR | 101024186 | B1 | 3/2011 |

\* cited by examiner

SYSTEM AND METHOD FOR CONTROLLING DISCHARGE OF A BATTERY

CROSS-REFERENCE TO PRIOR APPLICATIONS

This application is the U.S. National Phase application under 35 U.S.C. § 371 of International Application No. PCT/EP2019/058503, filed on Apr. 4, 2019, which claims the benefits of European Patent application Ser. No. 18/174,070.5, filed on May 24, 2018, and Indian Patent Application No. 201841013149, filed on Apr. 6, 2018. These applications are hereby incorporated by reference herein.

FIELD OF THE INVENTION

This invention relates to systems which include batteries.

BACKGROUND OF THE INVENTION

Rechargeable batteries are used in numerous applications. They are for example used as temporary energy storage devices in systems having time-varying power output and time-varying energy input. For example, lighting luminaires are increasingly being provided with integrated batteries. These may be charged by solar energy, which is typically available when the lighting is not needed, whereas lighting is needed when the solar energy is not available. Thus, they function as energy storage elements to account for the time delay between the availability of energy for charging and the requirement for output power.

Particularly for outdoor luminaires, but more generally for outdoor systems, the battery will generally be exposed to the ambient temperature.

The performance of rechargeable batteries such as lithium-ion (LiFePo4) batteries depends on stress parameters such as the maximum charging voltage per cell, the charge and discharge currents, the depth of discharge (DOD) and the battery operating temperature during its course of usage. The cycle life of the battery reduces as the charge and discharge currents, DOD and maximum charging voltage per cell increase. The operating temperature of the battery also shows a considerable impact on life, if battery is operating other than room temperatures.

For example, low temperature battery charging (e.g. less than 10 degrees Celsius) significantly affects the battery cycle life. It has been seen from experiment that if a LiFePo4 cycles at 25 degrees Celsius and offers a life time of 5500 cycles, then if the same battery is cycled at 10 degrees Celsius, it will offer 3750 cycles, and if the same battery is cycled at −10 degrees Celsius, it will offer only 146 cycles.

The table below shows the number of cycles $N_f$ of the battery life time at different temperatures (with 100% depth of charge).

| Temperature | $N_f$ |
| --- | --- |
| −10° C. | 146 ± 15 |
| 10° C. | 3750 ± 60 |
| 25° C. | 5550 ± 500 |
| 35° C. | 4930 ± 1000 |
| 50° C. | 1950 ± 350 |

In the case of outdoor luminaires with integrated batteries, the battery will experience extremely low temperatures in many regions. Even for interior luminaires for example for office spaces, the battery will be placed above the luminaire and hence in a less insulated part of a building. Again, the battery may experience extremely low or elevated temperatures.

There is a need to improve the efficiency of utilization of batteries generally, and particularly in conditions where the battery is exposed to significant temperature variations and particularly cold temperatures.

SUMMARY OF THE INVENTION

The invention is defined by the claims.

Examples in accordance with the invention provide a system comprising:
a battery;
a load;
a power converter for converting battery power from the battery into load power for application to the load; and
a system controller, wherein the system controller is adapted to enable selection between a continuous discharge mode and a discontinuous discharge mode of the battery.

A discontinuous discharge mode of a battery may be used to improve battery utilization, in particular utilization of available energy storage, cycle life, specific energy and specific power. The discontinuities introduce faster relaxation which assists in battery performance optimization. This may for example be of particular interest for low temperature operation.

The power converter may comprise a switch mode power converter which comprises an energy storage and a switching arrangement for controlling the switching of battery power to the energy storage and from the energy storage to the load.

In a first example, the controller is adapted to control a switching frequency of the switching arrangement. By controlling the switching frequency, the time available for charging and discharging cycles is changed. As a result, the current waveform may transition between a continuous mode and a discontinuous mode.

In a second example, the controller may be adapted to control an impedance of the energy storage.

By controlling the impedance, the charging and discharging time constants are altered, which has the effect of changing the slopes of the battery current waveform. This may be used to control the overall current level, so that the average (or rms) current delivered remains the same when switching between the operating modes.

The energy storage may comprise first and second inductors in parallel, and a switch for selectively connecting or disconnecting one of the inductors. The energy storage may thus be configured as a single inductor or a pair of inductors in parallel. This provides one way to control the impedance of the energy storage.

The controller may instead (or additionally) be adapted to control coupling of a smoothing output capacitor to the power converter. By controlling the output smoothing, it is again possible to select between a continuous mode and a discontinuous mode.

The controller may be adapted to implement an equal rms output current when switching between the continuous discharge mode and a discontinuous discharge mode. In this way, the load sees the same rms current, so that the control transitions are not perceived by a user of the system.

The system may comprise an input for connection to an external power supply, and the controller is adapted to provide a continuous power to the load during the discontinuous discharge mode by using the external power supply during the discontinuities. This maintains a continuous power supply to the load, while ensuring discontinuous battery discharging. The external power supply is for example a mains supply.

The system may comprise a plurality of batteries, and the controller is adapted to select at least two batteries to deliver the output power to the load alternately, thereby to implement the discontinuous discharge mode of the at least two batteries. This provides an alternative way to achieve discontinuous battery discharging but a continuous supply to the load.

The power converter for example comprises a buck converter or a boost converter.

The load is for example a lighting arrangement and the system comprises a LED luminaire.

The system is thus a battery-integrated luminaire. The battery may for example be charged by solar energy, which is typically available when the lighting is not needed, whereas lighting is needed when the solar energy is not available. Thus, the battery functions as an energy storage element to account for the time delay between the availability of energy for charging and the requirement for output power. The discontinuous mode may be of particular interest during lighting in cold periods, such as during the night in winter. The battery may instead be charged by mains power and has the purpose of time shifting as a function of the demand levels hence pricing levels of mains electricity.

The invention also provides a method of controlling a system which comprises a battery, a load and a power converter for converting battery power from the battery into load power for application to the load, wherein the method comprises:

selecting between a continuous discharge mode and a discontinuous discharge mode of the battery.

The power converter may comprise a switch mode power converter which comprises an energy storage and a switching arrangement for controlling the switching of battery power to the energy storage and from the energy storage to the load, wherein the method comprises implementing the selection by:

controlling an impedance of the energy storage of the switch mode power converter; and/or
controlling a switching frequency of a switching arrangement of the switch mode power converter; and/or
controlling coupling of a smoothing output capacitor to the switch mode power converter.

The method may comprise providing a continuous power to the load during the discontinuous discharge mode by using an external power supply during the discontinuities. The method may comprise selecting at least two batteries from a plurality of batteries to deliver the output power alternately, thereby to implement the discontinuous discharge mode of the at least two batteries.

The method is preferably for controlling a LED luminaire.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
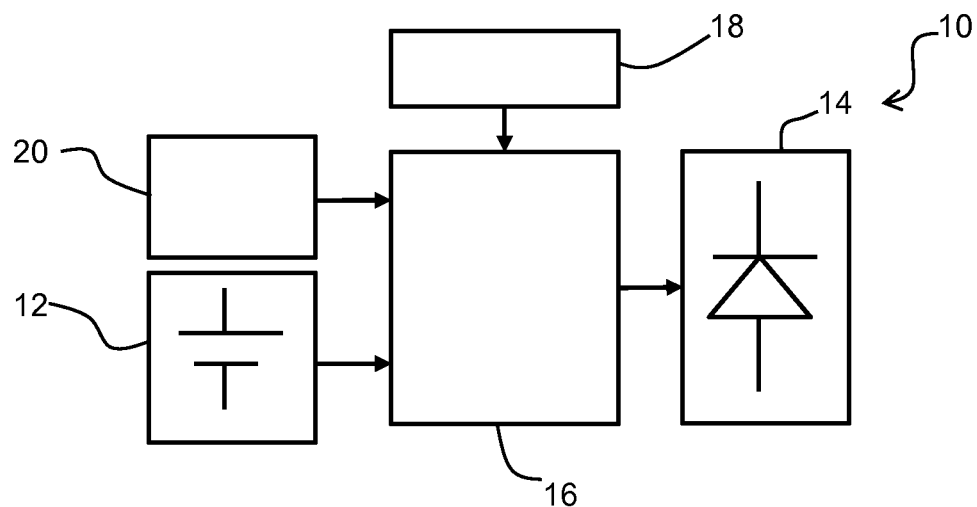
FIG. 1 shows a system 10 comprising a battery, load 14 and a power converter.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system which comprises a battery, a load and a power converter for converting battery power from the battery into load power for application to the load. A system controller enables selection between a continuous discharge mode and a discontinuous discharge mode of the battery. In this way, the battery can be operated in different ways according to the most appropriate battery discharge characteristics.

The concept of pulse discharging of a battery is based on successive changes in current rate and/or direction rather than using a constant discharging current. Basically, the current can either be interrupted, introducing a shorter rest period, or replaced by a short charge pulse. These short rest periods are believed to increase the speed of relaxation, and short current inversions may enable both faster relaxation and reverse the electrochemical process direction within the battery.

Some literature suggests that pulsed currents or voltages can affect the transport mechanisms of li-ion batteries. The depolarizing pulses can enable a considerable enhancement of the battery charging and discharging performance. For example C. F. Chiasserini and R. R. Rao, "Pulsed battery discharge in communication devices," in Proc. 5th Annu. ACM/IEEE Int. Conf. Mobile Comput. Netw., Seattle, WA, 1999, pp. 88-95 shows use of a pulse discharge profile with carefully selected amplitudes and rest periods, in order to increase both the specific energy and the specific power of a cell. Furthermore, other studies indicate that pulsing the potential of the electrode enables a control of the thickness of the equivalent diffusion layer and hence limits the concentration of over-potentials. Pulse discharging (and optionally also charging) can thus be considered as an interesting candidate for battery performance optimization.

The interfacial resistance is highest at low temperatures and at the end of discharge. For a given state-of-charge, the interfacial resistance grows exponentially with decreasing temperature. Thus, the need for efficient battery use is particularly important at low temperatures.

FIG. 1 shows system 10 comprising a battery 12, a load 14, a power converter 16 for converting battery power from the battery into load power for application to the load and a system controller 18.

The system controller 18 is adapted to enable selection between a continuous discharge mode and a discontinuous discharge mode of the battery. The discontinuous discharge mode of a battery is used to improve battery utilization, in particular utilization of available energy storage, cycle life, specific energy and specific power. The discontinuities introduce faster relaxation which assists in battery performance optimization.

FIG. 1 shows a further external power supply 20. In one example, this is a mains supply. In such a case, the battery may be used to deliver power at peak times (and hence cost) of the mains power, and the mains power may be used to recharge the battery. In another example, the supply 20 is a solar energy supply. In such a case, the battery is used to provide power when direct solar power is not available.

Figure 2:
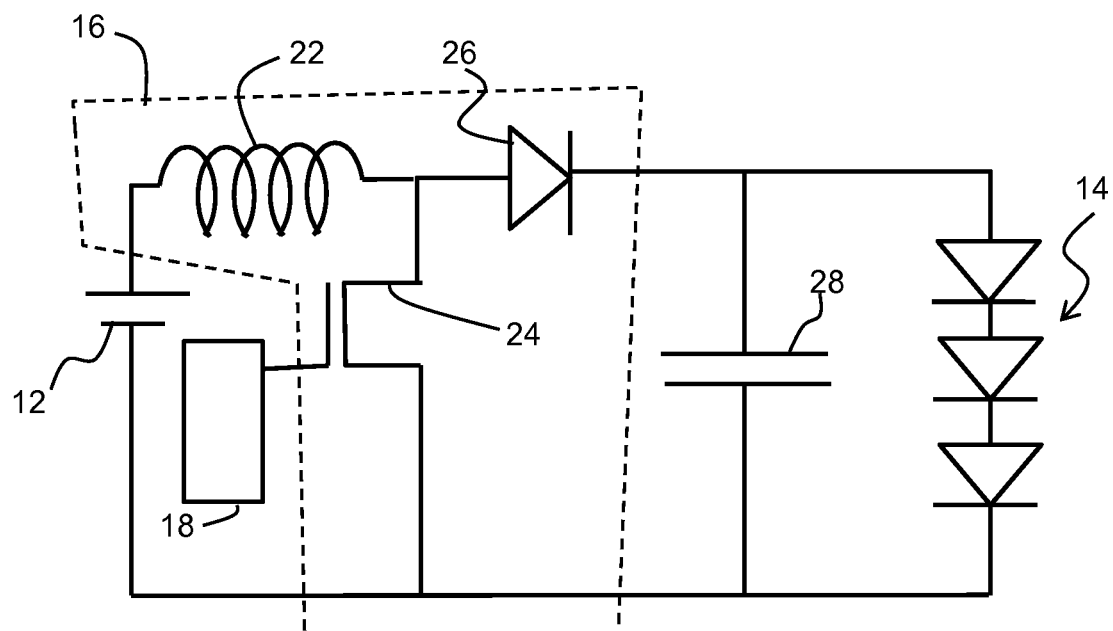
FIG. 2 shows one example of a possible power converter.

FIG. 2 shows one example of a possible power converter 16 comprising a switch mode power converter. The switch mode power converter comprises an energy storage 22 and a switching arrangement 24, 26 for controlling the switching of battery power to the energy storage and from the energy storage to the load.

This example is a boost converter, in which the switching arrangement comprises a high frequency main switching transistor 24 and diode 26, and an inductor 22 as the energy storage. A smoothing capacitor 28 is provided in parallel with the output load 14.

In a first example, the controller 18 is adapted to control a switching frequency of the main transistor 24. By controlling the switching frequency, the time available for charging and discharging cycles is changed. As a result, the current waveform may transition between a continuous mode and a discontinuous mode.

Figure 3:
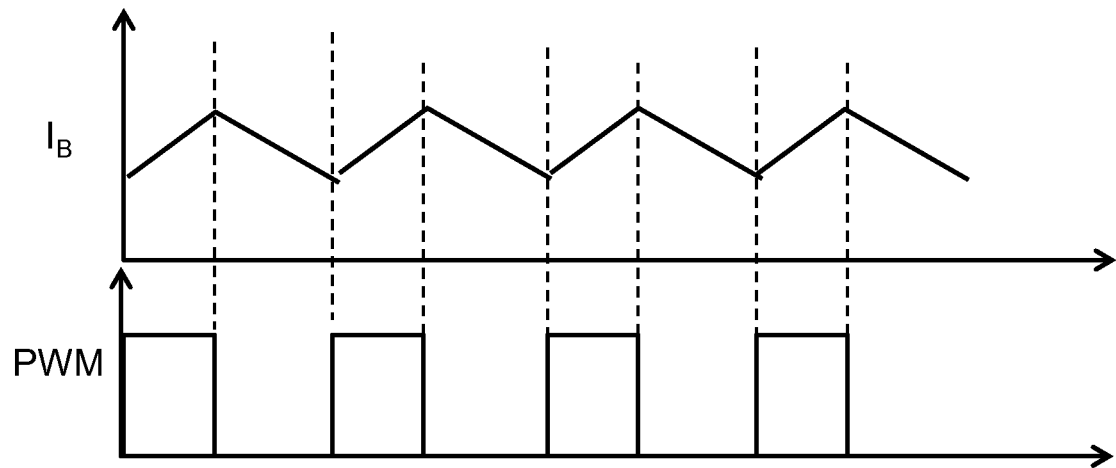
FIG. 3 shows waveforms for the continuous mode of operation of the power converter of FIG. 2.

FIG. 3 shows waveforms for the continuous mode of operation.

The top plot shows the current drawn from the battery, $I_B$, and the bottom plot shows the pulse width modulation (PWM) signal applied by the controller 18 to the main transistor gate. The energy conversion ratio is controlled based on the duty cycle of the PWM signal. The increasing current ramps correspond to inductor charging and the decreasing current ramps correspond to inductor discharge to the load.

This continuous operation may be achieved by operating at a first frequency, such as 50 kHz.

Figure 4:
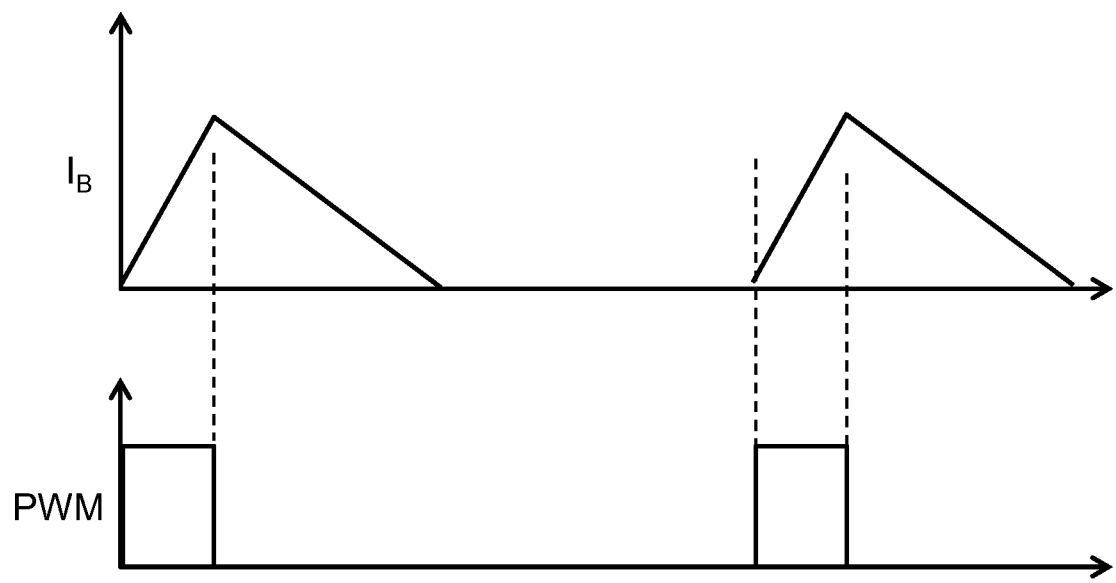
FIG. 4 shows waveforms for the discontinuous mode of operation of the power converter of FIG. 2.

FIG. 4 shows waveforms for the discontinuous mode of operation.

The top plot again shows the current drawn from the battery, $I_B$, and the bottom plot shows the pulse width modulation (PWM) signal applied by the controller 18 to the transistor gate. This discontinuous operation may be achieved by operating at a second, lower, frequency, such as 30 kHz. The effect is that the decreasing current drawn from the battery drops to zero because the energy storage is fully depleted.

The discontinuous mode for example has a switching frequency between 10% and 70% of the continuous mode switching frequency, for example half the switching frequency.

This type of boost converter is for example often used in a battery integrated LED luminaires as in most cases the battery voltage is below the required LED string voltage. When the converter is operated at a high frequency as shown in FIG. 3, for example in the range 50 to 100 kHz, the battery current is continuous because the converter will operate in a continuous conduction mode (CCM) giving rise to a continuous DC battery current. By keeping the maximum inductor current within the saturation limit, the operating frequency can be reduced such that the battery current becomes discontinuous or at the boundary conduction mode.

A consequence of this frequency reduction method to implement a discontinuous conduction mode is that the output current i.e. LED current may need to be reduced because the power delivery from the battery to LED string will be limited by the inductor saturation limit. The frequency reduction may for example be used during a during dimming mode of operation to improve battery performance.

Figure 5:
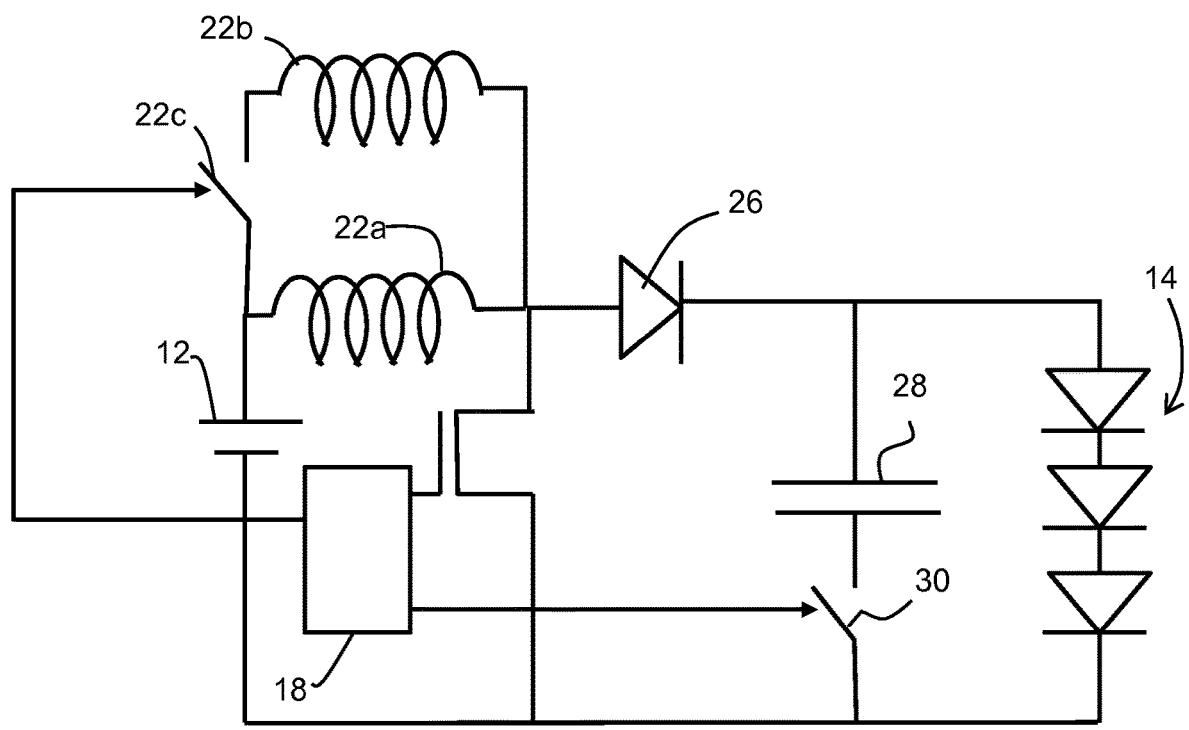
FIG. 5 shows a power converter in the form of a modified boost converter in which the energy storage (inductor) is formed as two parallel inductors.

FIG. 5 shows a modified boost converter in which the energy storage (inductor) is formed as two parallel inductors 22a, 22b, with a switch 22c for controlling the connection of the second inductor 22b. The inductance is thus switchable between two values. The different inductance value changes the temporal characteristics of the circuit. The switching is controlled by the system controller 18.

The switchable inductor is used to overcome the inductor saturation limit and maintain the same LED current despite the reduced frequency.

Figure 6:
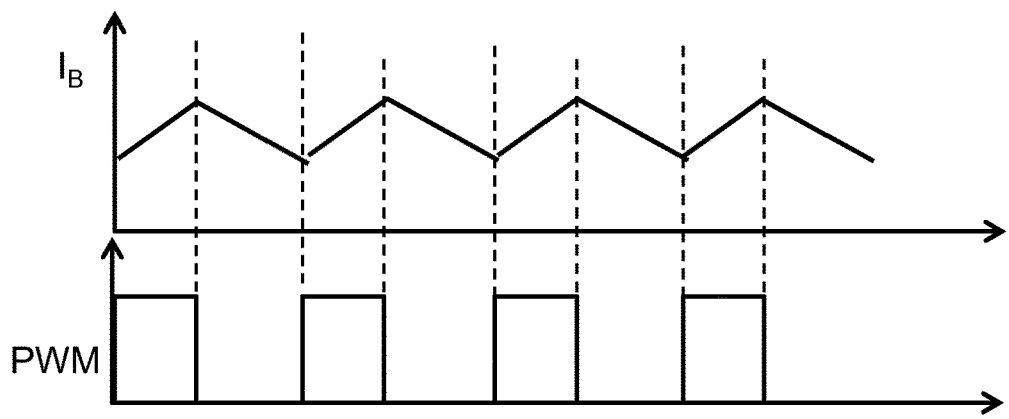
FIG. 6 shows the normal continuous operating mode of the power converter of FIG. 5.

FIG. 6 shows the normal continuous operating mode with only the first inductor 22a. During this normal high frequency (50-100 kHz) operating mode, the battery current is continuous and DC in nature and inductor 22a carries the battery current.

Figure 7:
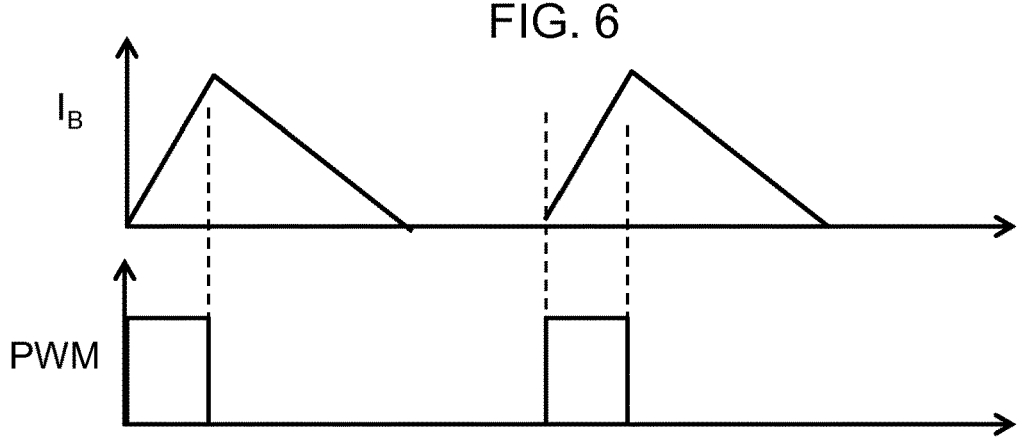
FIG. 7 shows the effect of a reduced inductance of the power converter of FIG. 5.

FIG. 7 shows the effect of a reduced inductance by having both inductors in parallel and also reducing the switching frequency. The slope of the current profile is increased as a result of the reduced inductance and the discontinuous mode results from the frequency reduction.

The benefit of this combined approach is that the rms current is able to be maintained at a constant level. The increase in current compensates for the reduced time when current flows. By switching the two inductors in parallel the current delivery limit is enhanced by two times even at low frequency operation.

In both approaches, the LED current will be continuous as a result of the output capacitor filter. By controlling the impedance, the charging and discharging time constants are altered, which has the effect of changing the slopes of the battery current waveform. The two inductors in parallel enable double the peak current to be carried so that the pauses between peaks can be longer.

The controller 18 may instead or additionally be adapted to control coupling of the smoothing output capacitor 28 to the power converter. By controlling the output smoothing, it is again possible to select between a continuous mode and a discontinuous mode.

Figure 8:
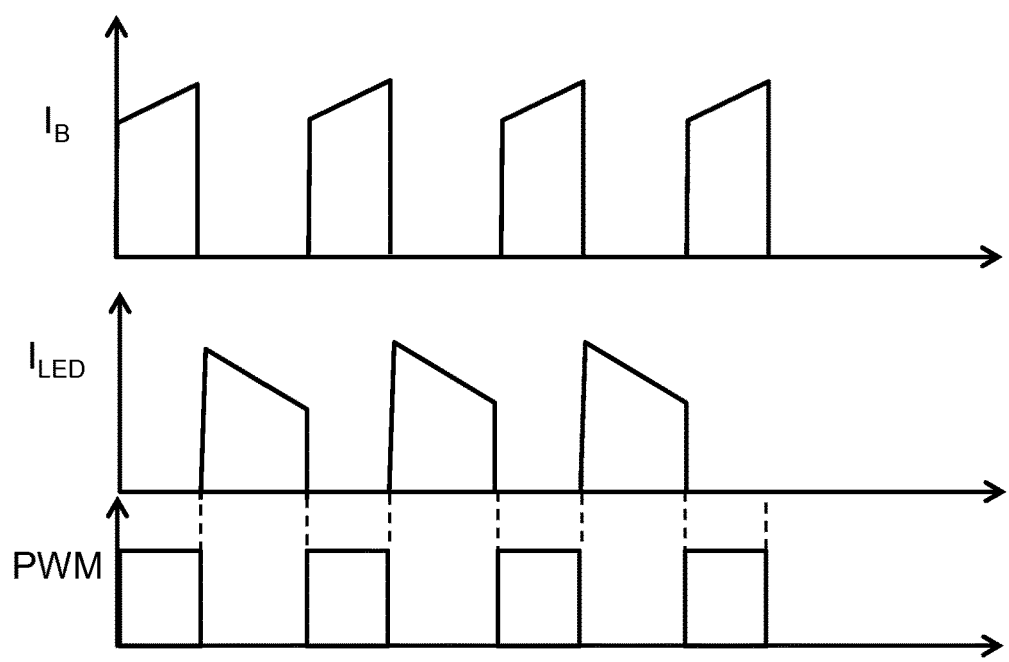
FIG. 8 shows the effect on the waveform of FIG. 6 of removing the output capacitor.

FIG. 8 shows the effect on the waveforms of FIG. 6 of removing the output capacitor for example by opening a switch 30 in series with the output capacitor. The result is that the LED experiences a pulsating current $I_{LED}$ with the same frequency as the battery pulsating current.

During inductor charging (with the main switch 24 closed), current flows from the battery to the inductor whereas during inductor discharging (with the main switch 24 open), current $I_{LED}$ flows to the LED load.

Figure 9:
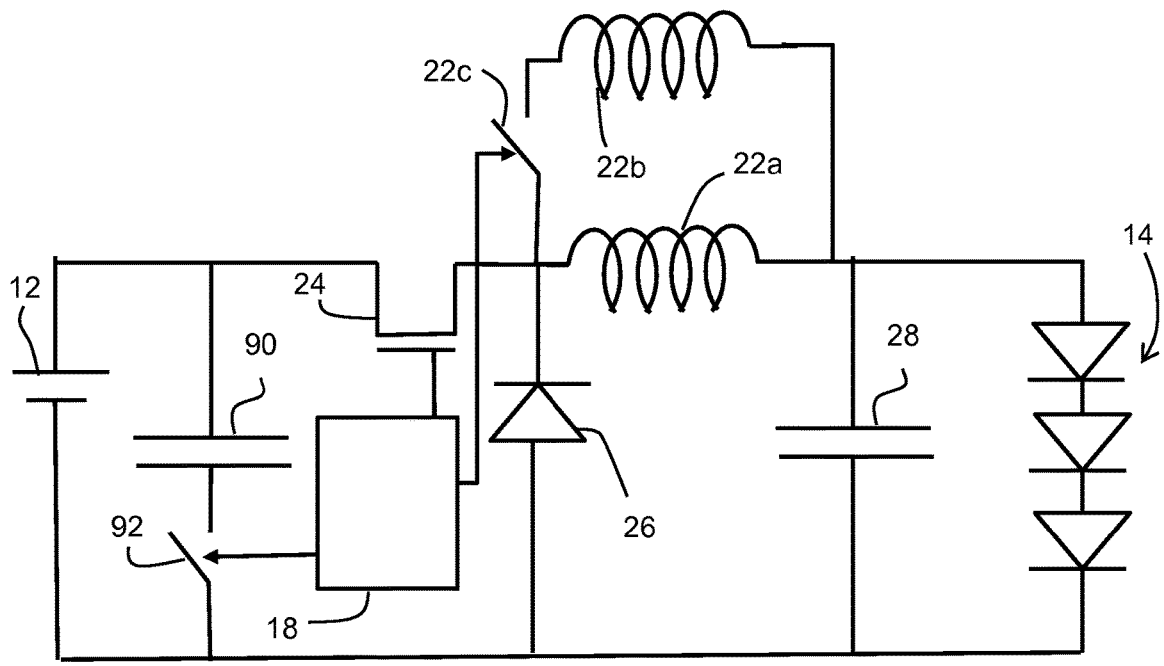
FIG. 9 shows a power converter based on a buck converter.

FIG. 9 shows an implementation based on a buck converter. This is suitable for an application where the battery voltage is higher than the LED string voltage. The same components are given the same reference as in the boost converter. There is an input filter circuit across the battery, comprising a filter capacitor 90 in parallel with the battery 12 and a series switch 92. When the main switch 24 is closed, the current flows from the capacitor 90 to the inductor through the switch 24 and when the switch 24 is open the depleted charge in the capacitor is replenished by the battery.

A series resistance (or inductance) may be provided between battery 12 and the capacitor 90. The current path from the capacitor into the down converter is by a low ohmic connection. When the series switch 92 is opened the recharging by the battery is interrupted and the current ripple of the down converter is fully supported by the battery.

Figure 10:
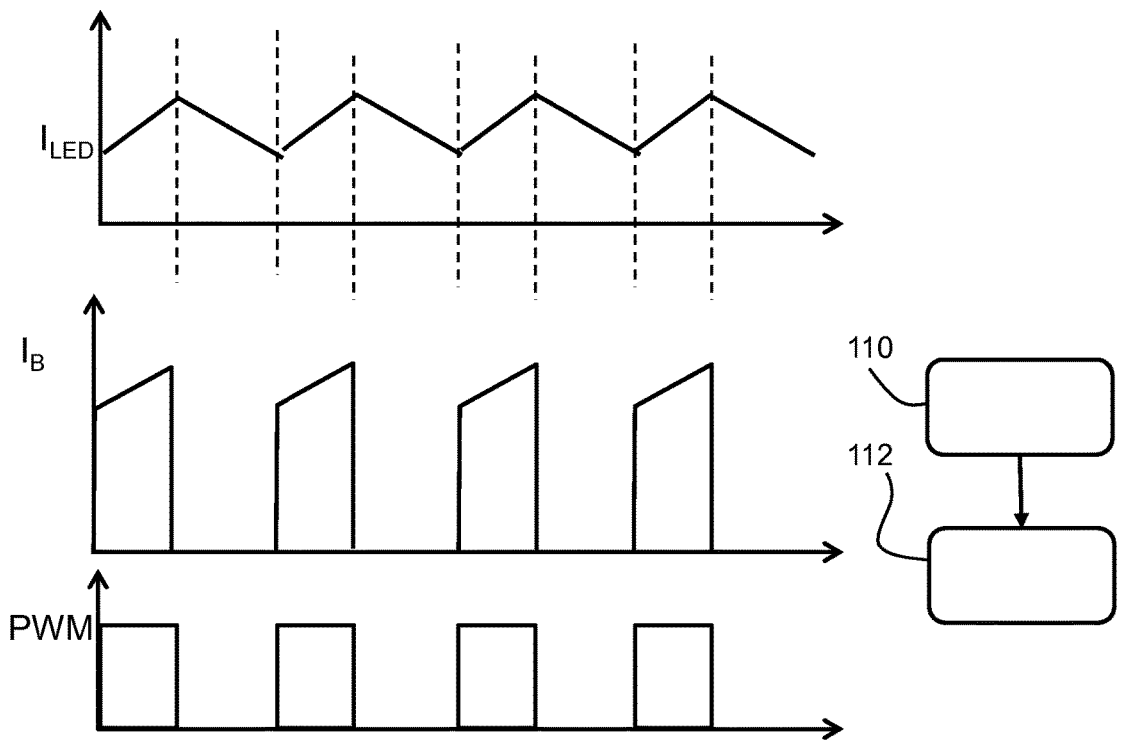
FIG. 10 shows timing diagrams to explain the function of the circuit of FIG. 9 during normal operation, which is the discontinuous mode.

FIG. 10 shows timing diagrams to explain the circuit function during the normal operation, which is the discontinuous mode.

The battery experiences a pulsating current $I_B$. To maintain the same LED current at different frequencies and duty cycles, inductor switching is employed as explained above.

The LED current $I_{LED}$ is continuous as shown.

As shown in FIG. 1, the system has an input for connection to an external power supply 20. This may be used to ensure that a continuous power is provided to the load during the discontinuous discharge mode by using the external power supply during the discontinuities. The external power supply is for example a mains supply. In this way, the battery current and mains supply (or charger) current may be interleaved. The load current pulsations are then made independent of the battery current pulsations. Also during charging of the battery, the LEDs may be used to intermittently load the battery causing a current ripple.

Alternatively, the system may comprise a plurality of batteries, and the controller 18 is then adapted to select at least two batteries to deliver the output power to the load alternately. This implements the discontinuous discharge mode of the at least two batteries while maintaining a continuous supply to the load. Two or more batteries may be used to transfer current between them to provide another way to shape the current pulses.

Figure 11:
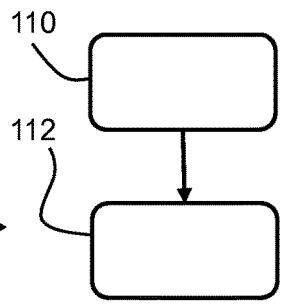
FIG. 11 shows a method of controlling the system.

FIG. 11 shows a method of controlling a system which comprises a battery, a load and a power converter for converting battery power from the battery into load power for application to the load. The method comprises in step 110 selecting between a continuous discharge mode and a discontinuous discharge mode of the battery. The load is powered in step 112 according to the selected operating mode.

As explained above, the mode selection may be based on one or more of:
 controlling an impedance of the energy storage of the switch mode power converter;
 controlling a switching frequency of a switching arrangement of the switch mode power converter;
 controlling coupling of a smoothing output capacitor to the switch mode power converter.

The invention provides a system which can switch between a continuous and discontinuous conduction mode. There is of tradeoff between the two modes. The discontinuous mode improves battery performance but reduces power delivery capability hence it can be implemented during dimming mode operation not at the rated power operation of the LED string. The addition of inductor switching however allows the rated current output to be maintained.

The pulsed battery discharge may not always improve battery performance. This may depend on various operating conditions, such as temperature (DCM is efficient at low temperature operation) and battery chemistry. Therefore, by providing a driver with the capability to switch between continuous and discontinuous modes, the driver is future proof and can be applied for battery performance improvement at any external operating conditions for any battery chemistry. This also enables a single driver design to be compatible with multiple applications such as low temperature areas as well as high temperature areas.

It can be seen that the decision to switch between modes may be based on a variety of sources of information, such as:
 the temperature;
 the dimming level of the LED luminaire;
 the type of connected battery;
 the state of charge of the battery;
 the state of health of the battery.

A battery impedance may be measured during periods of current ripple. This may be used state of charge and state of health evaluation. As the current ripple is generated intentionally, the impedance can be directly monitored by measuring the battery terminal voltage waveforms which result from the current pulses.

Battery impedance measurements give interesting information about state of charge as well as state of health of many battery systems. However, the ohmic resistance of a battery is often very small and hence the phase shifts seen between voltage and current can be very small or be dominated by the cabling. In battery integrated lamps, the battery cabling is often very short and hence impedance effects can be often monitored.

The examples of a buck converter and boost converter have been given above. However, the converter may be a buck-boost converter, a push-pull converter, a forward converter, or a half-bridge or full bridge inverter.

The LED current may for example be generated using a purely resistive circuit with the consequence that the battery current is the same as the LED current. At high frequency, the resulting ripple will be acceptable as it will not be seen to the naked eye, assuming a flicker rate above about 400 Hz. Slower flicker may also be acceptable in some applications such as street lighting. A local energy such as a capacitor and/or inductance may be used not as part of a switch mode power supply, again to give the freedom to generate a battery current discharge ripple independently of an LED flux ripple.

The invention is of interest for outdoor solar luminaires, where during winter season and at night, low temperature discharging is expected so that pulse discharging will be effective. The battery may instead be used for time-shifting i.e. demand responsive lighting. During high demand periods, luminaires normally operate at a dimming mode, and again battery performance can be improved with DCM discharging.

The invention may however be applied more generally to battery operated loads.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system comprising:
   a battery;
   a load;
   a power converter for converting battery power from the battery into load power for application to the load; and
   a system controller, wherein the system controller is adapted to enable selection between a continuous discharge mode and a discontinuous discharge mode of the battery, wherein the controller is adapted to implement an equal rms output current when switching between the continuous discharge mode and a discontinuous discharge mode, wherein the power converter comprises a switch mode power converter which comprises an energy storage and a switching arrangement for controlling the switching of battery power to the energy storage and from the energy storage to the load.

2. The system as claimed in claim 1, wherein the controller is adapted to control a switching frequency of the switching arrangement.

3. The system as claimed in claim 1, wherein the controller is adapted to control an impedance of the energy storage.

4. The system as claimed in claim 3, wherein the energy storage comprises first and second inductors in parallel, and a switch for selectively connecting or disconnecting one of the inductors.

5. The system as claimed in claim 1, wherein the controller is adapted to control coupling of a smoothing output capacitor to the power converter.

6. The system as claimed in claim 1, comprising an input for connection to an external power supply, and wherein the controller is adapted to provide a continuous power to the load during the discontinuous discharge mode by using the external power supply during the discontinuities.

7. The system as claimed in claim 1, comprising a plurality of batteries, and wherein the controller is adapted to select at least two batteries to deliver the load power to the load alternately, thereby to implement the discontinuous discharge mode of the at least two batteries.

8. The system as claimed in claim 1, wherein the load is a lighting arrangement and the system comprises a LED luminaire.

9. A method of controlling a system which comprises a battery, a load, and a power converter for converting battery power from the battery into load power for application to the load, wherein the method comprises:
   selecting between a continuous discharge mode and a discontinuous discharge mode of the battery, wherein an equal rms output current when switching between the continuous discharge mode and a discontinuous discharge mode is implemented, wherein the power converter comprises a switch mode power converter which comprises an energy storage and a switching arrangement for controlling the switching of battery power to the energy storage and from the energy storage to the load, wherein the method comprises implementing the selection by:
   controlling an impedance of the energy storage of the switch mode power converter; and/or
   controlling a switching frequency of a switching arrangement of the switch mode power converter; and/or
   controlling coupling of a smoothing output capacitor to the switch mode power converter.

10. The method as claimed in claim 9, comprising providing a continuous power to the load during the discontinuous discharge mode by using an external power supply during the discontinuities.

11. The method as claimed in claim 9, comprising selecting at least two batteries from a plurality of batteries to deliver the load power alternately, thereby to implement the discontinuous discharge mode of the at least two batteries.

12. The method as claimed in claim 9 comprising controlling a LED luminaire.

* * * * *